United States Patent
Molini

(10) Patent No.: US 8,078,610 B2
(45) Date of Patent: Dec. 13, 2011

(54) OPTIMIZATION TECHNIQUE FOR DEALING WITH DATA SKEW ON FOREIGN KEY JOINS

(75) Inventor: Stephen Molini, Omaha, NE (US)

(73) Assignee: Teradata US, Inc., Dayton, OH (US)

( * ) Notice: Subject to any disclaimer, the term of this patent is extended or adjusted under 35 U.S.C. 154(b) by 685 days.

(21) Appl. No.: 12/055,535

(22) Filed: Mar. 26, 2008

(65) Prior Publication Data

US 2009/0248617 A1   Oct. 1, 2009

(51) Int. Cl.
*G06F 7/00* (2006.01)
*G06F 17/30* (2006.01)

(52) U.S. Cl. .................... 707/714; 707/968
(58) Field of Classification Search .............. 707/2, 714, 707/968
See application file for complete search history.

(56) References Cited

U.S. PATENT DOCUMENTS

| 5,121,494 | A  | * | 6/1992 | Dias et al. ................ 707/2 |
| 5,873,074 | A  | * | 2/1999 | Kashyap et al. ............ 707/2 |
| 2008/0059412 | A1 | * | 3/2008 | Tarin ..................... 707/2 |
| 2009/0024568 | A1 | * | 1/2009 | Al-Omari et al. .......... 707/2 |

* cited by examiner

*Primary Examiner* — Apu Mofiz
*Assistant Examiner* — Chelcie Daye

(57) ABSTRACT

A method for determining when a database system query optimizer should employ join skew avoidance steps. The method includes dynamically calculating the worst-case anticipated frequency distribution for a particular relation along a particular set of join column(s) at query execution time. The calculated frequency distribution value is compared to a skew threshold, the skew threshold representing the number of rows on the same distinct value that would lead to avoidable processing inefficiencies. It is then determined that the database system query optimizer should employ join skew avoidance steps if the calculated frequency distribution value exceeds the skew threshold.

8 Claims, 3 Drawing Sheets

OPTIMIZATION TECHNIQUE FOR DEALING WITH DATA SKEW ON FOREIGN KEY JOINS

BACKGROUND

Computer systems generally include one or more processors interfaced to a temporary data-storage device such as a memory device and one or more persistent data-storage devices such as disk drives. Each disk drive generally has an associated disk controller. Data is transferred between the disk drives and the disk controllers. Data is also transferred between the disk controller(s) and the memory device over a communications bus or similar.

Data organization in a computer system such as that above is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure.

The defined table structure is locally maintained but may not correspond to the physical organization of the data. In a parallel shared nothing relational database data can be stored across multiple data-storage facilities, each data-storage facility in turn including one or more disk drives.

Hash partitioning is a partitioning scheme in which a predefined hash function and map is used to assign rows in a table to respective processing modules and data-storage facilities. The hashing function generates a hash bucket number and the hash numbers are mapped to data-storage facilities.

Data skew during join operations is a troublesome problem for a massively parallel (MPP) database engine. Even though individual tables have effective primary index choices, there are queries that join the two tables that can suffer from skewed processing because there might be tens of millions of rows in one table all pointing to the same key in the second table.

Current approaches to planning joins either ignore the effects of skewing entirely or else require duplicating the "smaller" spool file on all nodes. With large spool files on large database configurations that may be a very costly approach.

SUMMARY

The techniques described below show how a database query optimizer can dynamically detect at query execution time that excessive data skew is probably going to occur on a foreign key join and how to insert additional steps into the query plan that will mitigate the effects of excessive skewing. These techniques do not require that the user submitting his or her query provide any hints or special syntax in their SQL and there is no additional overhead on the database administrator to do more than to regularly collect demographic statistics—currently a common practice in the industry.

Described below is a method for determining when a database system query optimizer should employ join skew avoidance steps. The method includes dynamically calculating the worst-case anticipated frequency distribution for a particular relation along a particular set of join column(s) at query execution time. The calculated frequency distribution value is compared to a skew threshold, the skew threshold representing the number of rows on the same distinct value that would lead to avoidable processing inefficiencies. It is then determined that the database system query optimizer should employ join skew avoidance steps if the calculated frequency distribution value exceeds the skew threshold.

Also described below is a method for dynamically determining at query execution time the data values from a set of relational join column(s) that will exceed a skew threshold. The method includes creating a skewed value temporary table, the table associating data values for common join columns between the first and second relation with partitioning factors representing distinct numbers, the partitioning factors used to replicate a proper subset of the second relation rows during the subsequent join operation. The temporary table is populated with one or more join column values from the first relation that have a row frequency greater than the skew threshold and the value-specific partitioning factor.

DETAILED DESCRIPTION

Figure 1:
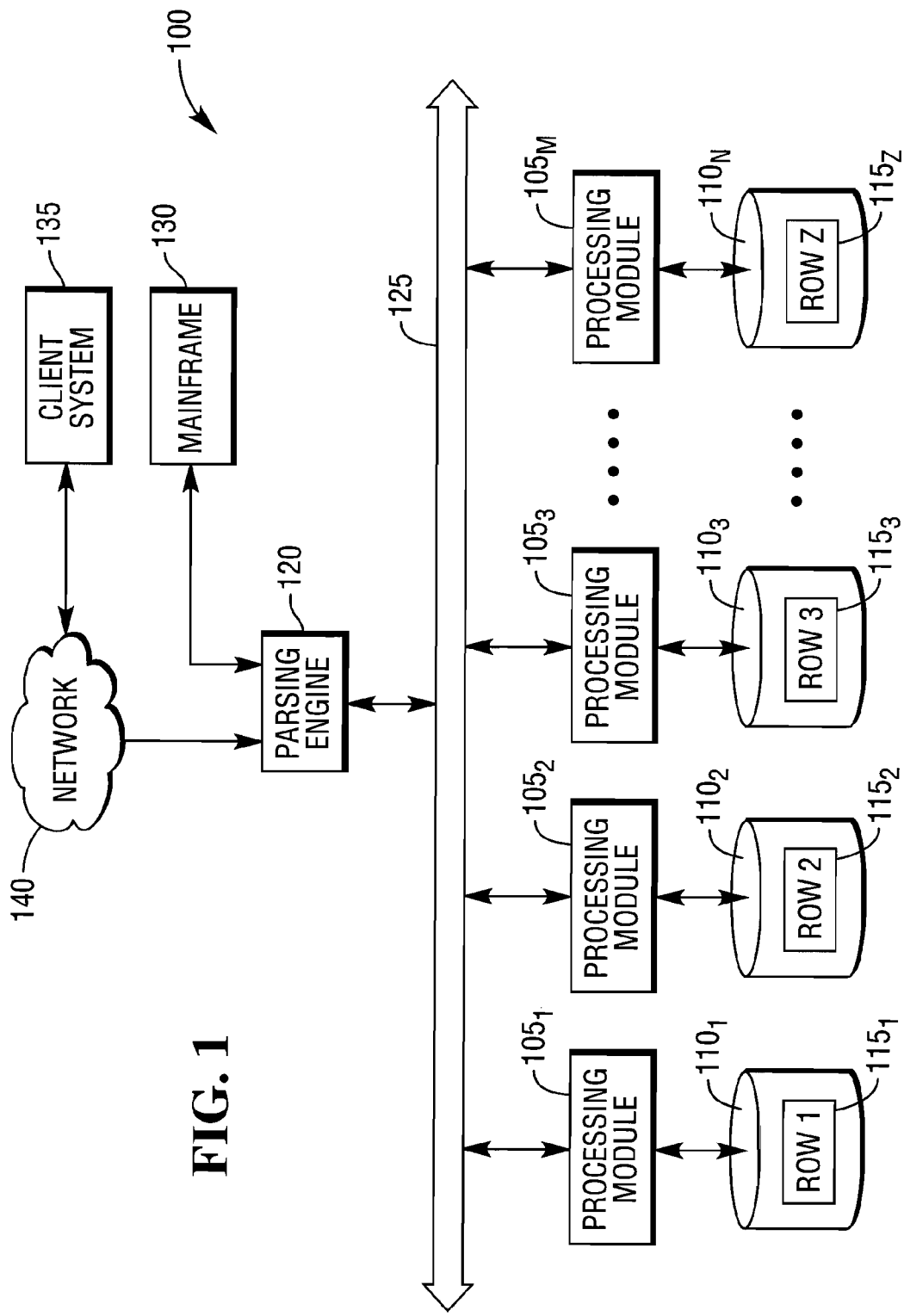
FIG. 1 is a block diagram of an exemplary large computer system in which the techniques described below are implemented.

FIG. 1 shows an example of a database system 100, such as a Teradata Active Data Warehousing System available from Teradata Corporation. Database system 100 is an example of one type of computer system in which the techniques of managing query optimization are implemented. In computer system 100, vast amounts of data are stored on many disk-storage facilities that are managed by many processing units. In this example, the data warehouse 100 includes a relational database management system (RDMS) built upon a massively parallel processing (MPP) platform.

The data warehouse 100 includes one or more processing modules $105_{1...M}$ that manage the storage and retrieval of data in data-storage facilities $110_{1...N}$. Each of the processing modules $105_{1...M}$ manages a portion of a database that is stored in a corresponding one of the data-storage facilities $110_{1...N}$. Each of the data-storage facilities $110_{1...N}$ includes one or more disk drives.

The system stores data in one or more tables in the data-storage facilities $110_{1...N}$. The rows $115_{1...Z}$ of the tables are stored across multiple data-storage facilities $110_{1...N}$ to ensure that the system workload is distributed evenly across the processing modules $105_{1...N}$. A parsing engine 120 organizes the storage of data and the distribution of table rows $115_{1...Z}$ among the processing modules $105_{1...N}$. The parsing engine 120 also coordinates the retrieval of data from the data-storage facilities $110_{1...N}$ over network 125 in response to queries received from a user at a mainframe 130 or a client computer 135 connected to a network 140. The database system 100 usually receives queries and commands to build tables in a standard format, such as SQL.

Figure 2:
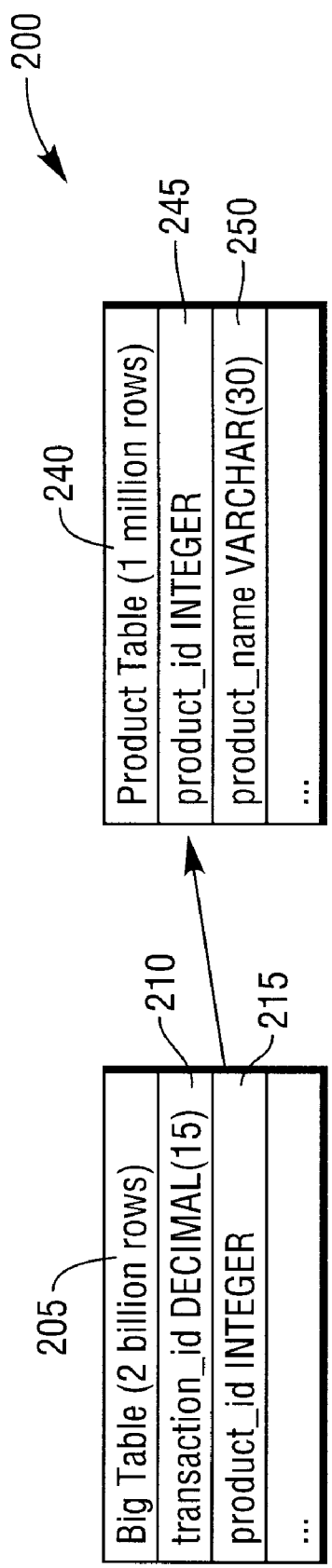
FIG. 2 shows an example of a database schema stored in the aforementioned computer system upon which the techniques described below are applicable.

FIG. 2 shows an example of a database schema stored in data warehouse 100. The database schema 200 includes a big or large table 205 and a product table 240. Big table 205 may have many billions of rows. Big table has a primary key of transaction_id 210. Big table 205 has further fields for example product_id 215.

Product table 240 has product_id 245 as a primary key. Product table 240 has further fields for example product_name 250 as well as other fields.

There is a foreign key relationship between big table 205 and product table 240. This means that big table 205 and product table 240 share one or more common field(s) but the shared field(s) is the primary key of only one of the tables. The product_id field 215 in big table 205 is not a primary key whereas product_id field 245 is a primary key for product table 240. The respective primary keys could well be effective primary index choices for their respective tables. However queries that join the two tables can suffer from skew processing because there might be tens of millions of rows in the big table 205 all pointing to the same product_id key 245 in product table 240.

Users are made aware of the impact of skew when queries execute slowly and ultimately return an error of "out of spool" conditions. General system performance is impacted if the only response by database administrators is to grant such users a larger spool allocation because the processing modules that run hot due to skewed joins end up slowing overall query throughputs. That is, some processing modules $105_{1 \ldots M}$ work harder whereas other processing modules sit idle when they could be helping to complete the join operation.

Currently, the main technique for avoiding the processing impact of a skewed join is to duplicate the smaller of the two tables (for example, product table 240) across all of the processing modules $105_{1 \ldots M}$ so that the rows from the larger table (for example, big table 205) can remain local to the nodes where they were stored prior to the join step. That approach can be problematic, however, if product table 240 is only small in a relative sense—it may contain millions of rows, too. In that case, the processing overhead of duplicating product table 240 across all of the processing modules $105_{1 \ldots M}$ might be significant enough that users and administrators still see "out of spool" conditions and slow performance. What is significant to recognize, however, is that out of possibly millions of rows in product table 240 there may be only a few hundred product_id key values that result in severe skewing. That is, if the database query optimizer can detect in advance that only certain rows from product table 240 need to be replicated across multiple processing modules 105, query throughputs can be maximised at the minimum overall cost to system performance.

The techniques described below attempt to distribute the workload associated necessary to process a skewed join across more processing modules 105 without having to resort to duplicating the smaller spool. The techniques described below permit the database system query optimizer to determine whether it is more effective to employ join the new skew avoidance steps versus the more traditional techniques that it already considers.

Figure 3:
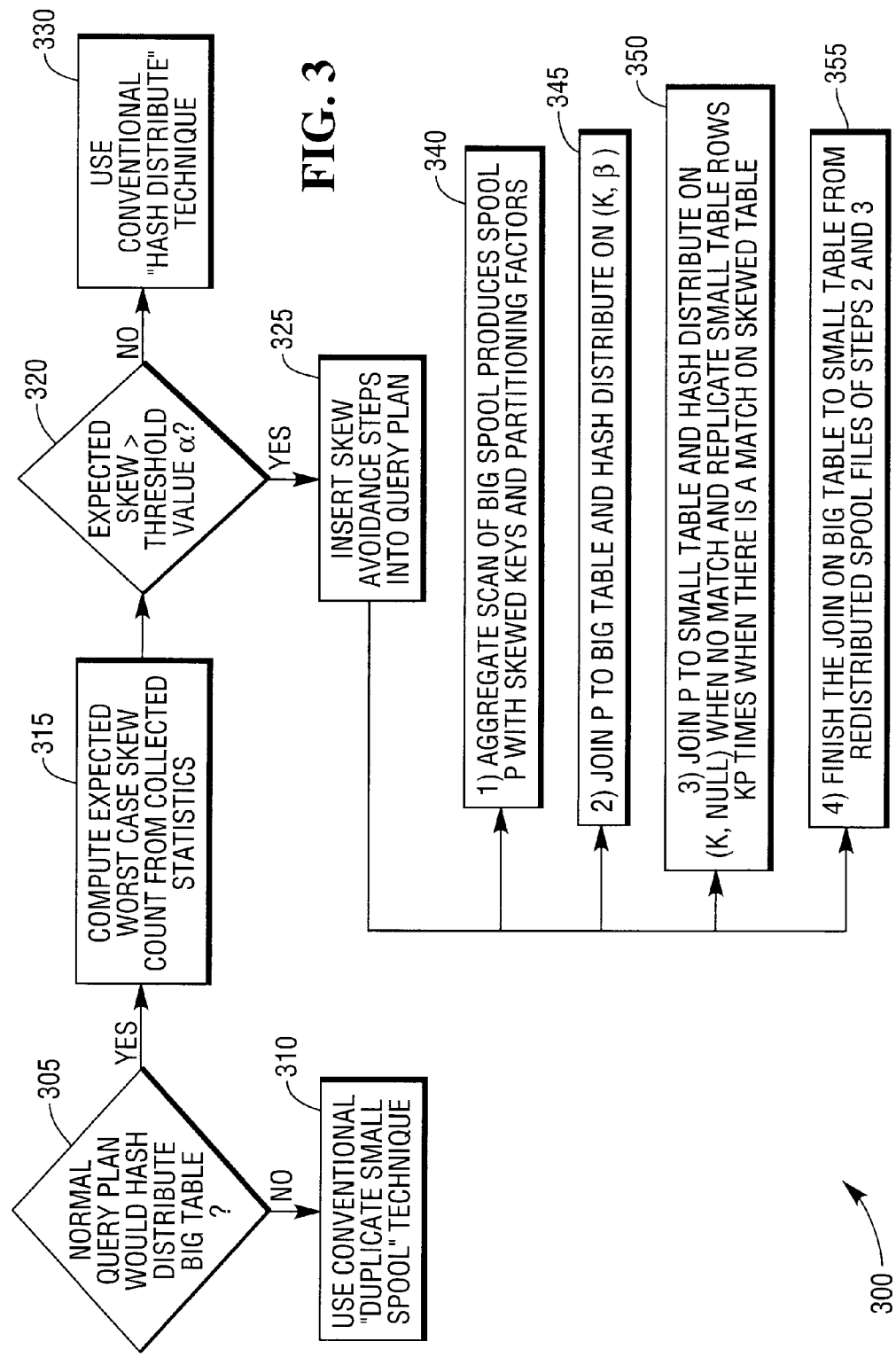
FIG. 3 is a generic decision tree that illustrates how a database query optimizer might incorporate the techniques described below.

FIG. 3 outlines a generic decision tree 300 showing how a database query optimizer would employ this new technique. The technique involves the definition of a skew threshold or target row count, $\alpha$, by which skewing of big table 205 is perceived to become unreasonable. Variations involving whether $\alpha$ is a site-tunable constant or dynamically determined from the current configuration or row size of tables involved are merely ways to be more precise about the optimization point. In the example discussed here, it is assumed that $\alpha$ is a site-tunable constant set at $\alpha=10,000$ rows.

It is first determined whether the normal query plan would hash distribute the big table as indicated at 305. If the answer is no then a conventional "duplicate small spool" technique is used 310.

On the other hand if a normal query plan would hash distribute a big table then the expected worst case skew count is computed from collected statistics 315. If the expected skew is greater 320 than the threshold $\alpha$ then the skew avoidance steps are inserted 325 into the query plan. On the other hand if the expected skew is not greater than the threshold value $\alpha$ then 330 a conventional "hash distribute" technique is used.

As shown in FIG. 3, the step 325 includes individual steps of aggregating 340 an aggregate scan of big spool produces spool P with skewed keys and partitioning factors. P is joined 345 to the big table and hash distributed on (K, $\beta$).

P is joined to the small table and hash distributed on (K, Null) as indicated at 350 when no match. Small table rows are replicated KP times when there is a match on skewed value.

The join is finished on the big table to small table 355 from redistributed spool files of steps 345 and 350 above.

Collected statistics on big table 205 identify the loner or mode values associated with the product_id column having the greatest frequency within the table. It typically is the case that not all of the data values that can cause skewing for joins will be reported in the demographic statistics collected by the database administrator.

The technique described below uses collected statistics to assess the probability that excessive skewing will occur and, if so, add extra steps to the query plan to mitigate the processing impact.

In one example the statistics indicate that big table 205 contains 8 billion rows. The worst case skewing on a single product_id key value is 50 million rows but the user query is not trying to pull all rows out of big table 205—other filter conditions on the query are expected to qualify only 10 million rows from big table 205 that need to be joined to product table 240. Therefore, the anticipated skew value is 10 million×50 million divided by 8 billion=62,500 rows. This anticipated skew value exceeds the target row count or skew threshold. The conclusion is that excessive skewing is expected so a modified join operation is recommended. If the anticipated skew value was less than the skew threshold then a conventional join operation is performed.

In a modified join operation a spool file of the big table 205 is kept local to an individual processing module 105.

An aggregate scan of the spool file generated from big table 205 is performed to determine the most skewed values and associated partition factor. The result is stored in a duplicated table referred to as spool P that is duplicated on all processing modules 105. The following SQL statements simulate this situation. The statements identify those keys that have frequency greater than or equal to $\alpha$ and computes a partitioning factor KP. For purposes of our example, K refers to the product_id column in big table 205. That is, K is the foreign key column(s) in big table 205 that will be used to join over to product table 204.

insert into spool_p
    select k, (count(*)/($\alpha$/2)) as kp
    from spool_x
    group by k
    having kp>=2;

The temporary duplicated table spool P is merge joined or hash joined to big table 205 on a right outer join via K so that each row that was qualified out of big table 205 is paired up with the anticipated skew factor, KP, for that key value. The result of the first temporary distributed table spool X is hash redistributed on the composite key of (K,$\beta$) where $\beta$ is effectively a randomized integer value between zero and KP−1. In short, the net effect of this aggregate scan, join, and re-distribution is to distribute rows from big table 205 that are NOT expected to be skewed according to the hash of (K, NULL) and to distribute rows that ARE expected to be skewed across multiple processing modules 105 in a randomized fashion depending upon what β works out to be.

The temporary duplicated table spool P is also merge joined or hash joined to product table 204 on a right outer join via K so that we can redistribute those rows appropriately, too. The difference, however, is that rows from product table 204 that match one of the skewed keys in P will be replicated KP times to whichever processing modules 105 own the hash of (K, 0), (K, 1), . . . , (K, KP−1). The assumption, of course, is that there are only a limited number of rows in spool P so this replication is much less overhead than duplicating the entire product table 204 to all processing modules 105.

In some cases, the partition factor for a key may exceed the total number of processing modules in the configuration. In this case KP is capped at the maximum number of processing modules 105. The assumption about a in the preconditions for falling into this logic ensures that spool P is always tiny enough that the duplication overhead is reasonable. The most significant added cost to this newer plan versus conventional approaches is the aggregate scan.

It does not matter if the user query request uses inner or outer joins between big table 205 and product table 204—the techniques are effectively the same. Also, generalizing the example above to involve composite key joins on $K_1, K_2 \ldots K_y$ instead of a single column K works the same.

From a user stand point there is nothing special that has to be altered in SQL statements. The user simply needs to presume that the database administrator collects statistics and keeps them current enough to reflect the actual data demographics on the big table.

The text above describes one or more specific embodiments of a broader invention. The invention also is carried out in a variety of alternative embodiments and thus is not limited to those described here. Those other embodiments are also within the scope of the following claims.

The invention claimed is:

1. A method for dynamically determining at query execution time the data values from a set of relational join column(s) that will exceed a skew threshold and performing skew avoidance, the method comprising the steps of:
   creating a skewed value temporary table, the table associating data values for common join columns between the first and second relation with partitioning factors representing distinct numbers, the partitioning factors used to replicate a proper subset of the second relation rows during the subsequent join operation;
   populating the temporary table with one or more join column values from the first relation that have a row frequency greater than the skew threshold and the value-specific partitioning factor;
   determining whether a row from the first relation matches a row from the temporary skewed values table on the join column(s);
   when a row from the first relation matches a row from the temporary skewed values table, hash-redistributing the row from the first relation across the data storage facility on a composite key comprising the aforementioned common join column(s) plus a calculated value that represents the unique set of data values contained within the row modulo the associated partition factor; and
   when a row from the first relation does not match any row from the temporary skewed values table, hash-redistributing the row from the first relation across the data storage facilities on the common join column(s) plus an explicit or implied constant default value.

2. A method for dynamically determining at query execution time the data values from a set of relational join column(s) that will exceed a skew threshold and performing skew avoidance, the method comprising the steps of:
   creating a skewed value temporary table, the table associating data values for common join columns between the first and second relation with partitioning factors representing distinct numbers, the partitioning factors used to replicate a proper subset of the second relation rows during the subsequent join operation;
   populating the temporary table with one or more join column values from the first relation that have a row frequency greater than the skew threshold and the value-specific partitioning factor;
   determining whether a row from the second relation matches a row from the temporary skewed values table on the join column(s);
   when a row from the second relation matches a row from the temporary skewed values table, replicating and then hash-redistributing the row from the second relation across the data storage facilities on a composite key comprising the common join column(s) plus a calculated value spanning all possible integer values modulo the associated partition factor; and
   when a row from the second relation does not match any row from the temporary skewed values table then hash-redistributing the row from the second relation across the data storage facilities on the common join column(s) plus an explicit or implied constant default value.

3. The method of claim 1 where the two hash-distributed relations are joined on the composite keys to complete the modified join operation.

4. The method of claim 2 where the two hash-distributed relations are joined on the composite keys to complete the modified join operation.

5. A non-transitory computer-readable storage medium containing computer instructions stored therein for causing a computer processor to perform a method for dynamically determining at query execution time the data values from a set of relational join column(s) that will exceed a skew threshold and performing skew avoidance, the computer instructions causing said computer processor to:
   create a skewed value temporary table, the table associating data values for common join columns between the first and second relation with partitioning factors representing distinct numbers, the partitioning factors used to replicate a proper subset of the second relation rows during the subsequent join operation;
   populate the temporary table with one or more join column values from the first relation that have a row frequency greater than the skew threshold and the value-specific partitioning factor;
   determine whether a row from the first relation matches a row from the temporary skewed values table on the join column(s);
   when a row from the first relation matches a row from the temporary skewed values table, hash-redistribute the row from the first relation across the data storage facility on a composite key comprising the aforementioned common join column(s) plus a calculated value that represents the unique set of data values contained within the row modulo the associated partition factor; and
   when a row from the first relation does not match any row from the temporary skewed values table, hash-redistribute the row from the first relation across the data storage facilities on the common join column(s) plus an explicit or implied constant default value.

6. A non-transitory computer-readable storage medium containing computer instructions stored therein for causing a computer processor to perform a method for dynamically determining at query execution time the data values from a set of relational join column(s) that will exceed a skew threshold and performing skew avoidance, the computer instructions causing said computer processor to:

create a skewed value temporary table, the table associating data values for common join columns between the first and second relation with partitioning factors representing distinct numbers, the partitioning factors used to replicate a proper subset of the second relation rows during the subsequent join operation;

populate the temporary table with one or more join column values from the first relation that have a row frequency greater than the skew threshold and the value-specific partitioning factor;

determine whether a row from the second relation matches a row from the temporary skewed values table on the join column(s);

when a row from the second relation matches a row from the temporary skewed values table, replicating and then hash-redistribute the row from the second relation across the data storage facilities on a composite key comprising the common join column(s) plus a calculated value spanning all possible integer values modulo the associated partition factor; and when a row from the second relation does not match any row from the temporary skewed values table then hash-redistribute the row from the second relation across the data storage facilities on the common join column(s) plus an explicit or implied constant default value.

7. The non-transitory computer-readable storage medium of claim 5 where the two hash-distributed relations are joined on the composite keys to complete the modified join operation.

8. The non-transitory computer-readable storage medium of claim 6 where the two hash-distributed relations are joined on the composite keys to complete the modified join operation.

\* \* \* \* \*